(12) United States Patent
Ichige et al.

(10) Patent No.: US 10,001,210 B2
(45) Date of Patent: Jun. 19, 2018

(54) LUBRICATION STRUCTURE AND TRANSMISSION

(71) Applicant: TOYOTA JIDOSHA KABUSHIKI KAISHA, Toyota-shi (JP)

(72) Inventors: Keisuke Ichige, Nagakute (JP);
Masanori Iritani, Nagakute (JP);
Hitoshi Takayama, Nagakute (JP);
Takahiro Shiina, Numazu (JP);
Daisuke Tokozakura, Susono (JP);
Satoshi Tominaga, Susono (JP);
Kazuya Arakawa, Fujinomiya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 210 days.

(21) Appl. No.: 15/046,981

(22) Filed: Feb. 18, 2016

(65) Prior Publication Data
US 2016/0245392 A1     Aug. 25, 2016

(30) Foreign Application Priority Data

Feb. 19, 2015   (JP) .................................. 2015-030917

(51) Int. Cl.
*F16H 57/04* (2010.01)
*F16C 33/66* (2006.01)
(Continued)

(52) U.S. Cl.
CPC ....... *F16H 57/0409* (2013.01); *F16C 33/565* (2013.01); *F16C 33/6637* (2013.01);
(Continued)

(58) Field of Classification Search
CPC ............. F16H 57/0409; F16H 57/0456; F16H 57/0457; F16H 57/046; F16H 57/0471;
(Continued)

(56) References Cited

U.S. PATENT DOCUMENTS

2006/0254419 A1* 11/2006 Leonard ................... H01G 7/02
95/57
2010/0024591 A1    2/2010 Yamaguchi
(Continued)

FOREIGN PATENT DOCUMENTS

CN          101535684 A    9/2009
CN          102379456 A    3/2012
(Continued)

*Primary Examiner* — William E Dondero
*Assistant Examiner* — Robert T Reese
(74) *Attorney, Agent, or Firm* — Oblon, McClelland, Maier & Neustadt, L.L.P.

(57) ABSTRACT

A lubrication structure includes a liquid drop splashing device and an electret portion. The liquid drop splashing device is configured to turn a lubricating liquid for lubricating machine-element components into liquid drops. The liquid drop splashing device is configured to splash the lubricating liquid turned into the liquid drops. The machine-element components configure contact parts. Each contact part is a part where corresponding adjacent machine-element components come into contact with each other. An electret portion is provided to a vicinity of each contact part. The electret portion is composed of an electret.

9 Claims, 8 Drawing Sheets

(51) Int. Cl.
*F16C 33/56* (2006.01)
*F16C 19/22* (2006.01)

(52) U.S. Cl.
CPC ....... *F16C 33/6648* (2013.01); *F16H 57/046* (2013.01); *F16H 57/0456* (2013.01); *F16H 57/0457* (2013.01); *F16H 57/0471* (2013.01); *F16H 57/0494* (2013.01); *F16C 19/22* (2013.01)

(58) Field of Classification Search
CPC ................ F16H 57/0491; F16C 33/565; F16C 33/6637; F16C 33/6648; F16C 19/22
See application file for complete search history.

(56) References Cited

U.S. PATENT DOCUMENTS

| | | |
|---|---|---|
| 2012/0031704 A1 | 2/2012 | Brasseur et al. |
| 2012/0073403 A1 | 3/2012 | Perakes et al. |
| 2013/0256064 A1 | 10/2013 | Bongaerts et al. |
| 2013/0256065 A1 | 10/2013 | Bongaerts et al. |
| 2013/0274159 A1 | 10/2013 | Bongaerts et al. |
| 2013/0296206 A1 | 11/2013 | Bongaerts et al. |
| 2013/0302609 A1 | 11/2013 | Bongaerts et al. |
| 2014/0123854 A1* | 5/2014 | Leonard .................... B03C 3/30 96/28 |
| 2014/0228163 A1 | 8/2014 | Aratsu et al. |

FOREIGN PATENT DOCUMENTS

| | | |
|---|---|---|
| CN | 103814239 A | 5/2014 |
| EP | 2 416 051 A1 | 2/2012 |
| JP | 5-69722 A | 3/1993 |
| JP | 5-69722 U | 9/1993 |
| JP | 2000-120707 | 4/2000 |
| JP | 2000-274516 | 10/2000 |
| JP | 2012-87822 A | 5/2012 |
| JP | 2012-87924 | 5/2012 |
| JP | 2014-228065 | 12/2014 |
| RU | 95 373 U1 | 6/2010 |
| SU | 1105718 A | 7/1984 |
| WO | WO 2012/055821 A1 | 5/2012 |

\* cited by examiner

F I G . 10
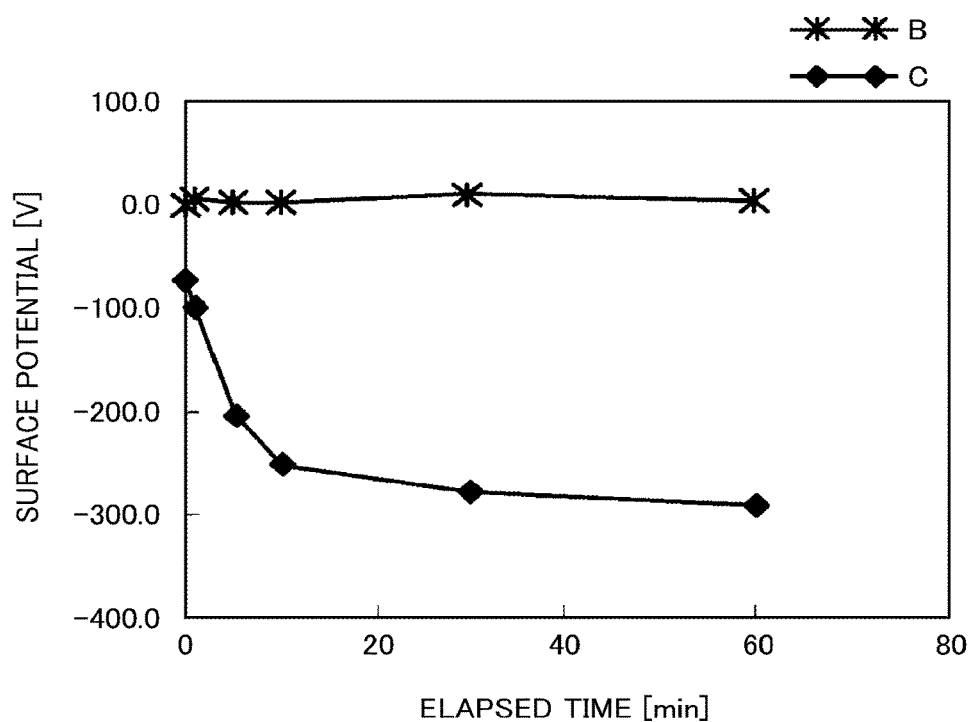

LUBRICATION STRUCTURE AND TRANSMISSION

INCORPORATION BY REFERENCE

The disclosure of Japanese Patent Application No. 2015-030917 filed on Feb. 19, 2015 including the specification, drawings and abstract is incorporated herein by reference in its entirety.

BACKGROUND

1. Technical Field

The present disclosure relates to a lubrication structure for machine-element components, and a transmission using this lubrication structure.

2. Description of Related Art

For example, there has been known a technique to form a thin lubricating oil film (oil film) on each contact part (sliding part) among machine-element components included in a bearing so as to suppress direct contact between metal surfaces of the components, thus suppressing occurrence of seizing, abrasion, or the like.

In order to suppress seizing and abrasion of machine-element components, there have been known a technique to provide part of machine-element components with roughness for retaining a lubricating oil therein (see Japanese Patent Application Publication No. 2012-87924), and a technique to configure part of machine-element components to be porous bodies impregnated with a lubricating oil (see Japanese Patent Application Publication No. 2000-120707).

SUMMARY

Meanwhile, if machine-element components are located at positions to which a lubricating oil is difficult to be fed, a large amount of lubricating oil is required to be directly fed to contact parts among the machine-element components. This is the same in the techniques disclosed in JP 2012-87924 A and JP 2000-120707 A, and if the lubricating oil retained in the roughness, or the lubricating oil with which the porous body is impregnated is exhausted, it becomes impossible to feed the lubricating oil to the contact parts among the machine-element components; therefore, a large amount of lubricating oil is required to be fed directly to the contact parts among the machine-element components.

Provided is a lubrication structure capable of lubricating contact parts among machine-element components without directly feeding a lubricating liquid. In addition, provided is a transmission using this lubrication structure.

A lubrication structure according to one embodiment includes a liquid drop splashing device and an electret portion. The liquid drop splashing device is means for forming the lubricating liquid for lubricating machine-element components into liquid drops, and splashing the liquid drops. The electret portion is provided to a vicinity of each contact part among the machine-element components. The electret portion is an electretized portion. The "liquid drops" referred to herein include liquid drops in a mist state, liquid drops in a splash state, or the like.

In the lubrication structure according to the above embodiment, the lubricating liquid is formed into liquid drops, and is splashed by the liquid drop splashing device. The splashed liquid drops are attracted and adhere to the electret portion in an electrified state. The electret portion is electretized into an electrified state. Since the electret portion is provided to the vicinity of each contact part among the machine-element components, the liquid drops adhering to the electret portion move to each contact part while combining into one with other adhering liquid drops, thereby lubricating the contact part. Hence, in the above lubrication structure, it is possible to lubricate the contact parts among the machine-element components without feeding the lubricating liquid directly to the contact parts among the machine-element components.

The lubrication structure according to the embodiment, the electret portion has liquid-repellency relative to the lubricating liquid.

In the lubrication structure according to the embodiment, since each electret portion has liquid-repellency relative to the lubricating liquid, the liquid drops adhering to the electret portion can easily move along the surface of the electret portion to each contact part among the machine-element components.

In the lubrication structure according to the embodiment, the electret portion has a smaller wettability relative to the lubricating liquid than that of each contact part.

In the lubrication structure according to the embodiment, the wettability relative to the lubricating liquid of the electret portion is set to be smaller than that of each contact part among the machine-element components; in other words, the wettability relative to the lubricating liquid of each contact part among the machine-element components is set to be greater than that of the electret portion; therefore, it is possible to efficiently lubricate the above contact part by the liquid drops of the lubricating liquid moving along the surface of the electret portion.

According to the embodiment, the electret portion is an electretized fluoropolymer film provided to a surface of each machine-element component.

In the lubrication structure according to the embodiment, the electretized fluoropolymer film provided to the surface of each machine-element component is used as the electret portion; therefore, for example, compared with a case of configuring part of each machine-element component to be the electret portion, it is possible to post-fix the electret portion to the machine-element component without requiring design changes of the machine-element components.

According to the embodiment, the lubrication structure further includes: a case that houses the machine-element components; and a liquid sump that is disposed to a bottom portion of the case, and is configured to reserve the lubricating liquid thereinside, wherein the liquid drop splashing device is soaked in the lubricating liquid reserved in the oil sump while the liquid drop splashing device is rotatably supported, the liquid drop splashing device includes a rotary member configured to scoop up the lubricating liquid in the oil sump by rotation, and splash the liquid drops inside the case.

In the lubrication structure according to the embodiment, the rotary member is rotated so as to scoop up the lubricating liquid in the liquid sump, and splash the liquid drops inside the case. It is possible to splash the liquid drops inside the case with such a simple configuration of using the rotary member.

In the lubrication structure according to the embodiment, the liquid drop splashing device includes a liquid drop generator configured to splash the lubricating liquid that is formed into liquid drops in a mist state.

In the lubrication structure according to the embodiment, the lubricating liquid is formed into liquid drops in a mist state, and is splashed by using the liquid drop generator; thus, weight of the liquid drops becomes smaller, and the liquid drops are easily attracted to the electret portion.

Accordingly, adhesive amount of the lubricating liquid (liquid drops) of the electret portion becomes increased; therefore, each contact part among the machine-element components can effectively be lubricated.

In the lubrication structure according to the embodiment, the machine-element components are components included in a bearing, and the electret portion is provided to a vicinity of each sliding part among the components.

In the lubrication structure according to the embodiment, it is possible to lubricate the sliding parts among the components included in each bearing without feeding the lubricating liquid directly to the sliding parts among the components.

In the lubrication structure according to the embodiment, the machine-element components are gears, and the electret portion is provided to a vicinity of a meshing part between corresponding adjacent gears.

In the lubrication structure according to the embodiment, it is possible to lubricate the meshing parts among the gears without feeding the lubricating liquid directly to the meshing parts among the gears.

A transmission according to the embodiment includes the lubrication structure as set forth in any one of claims 1 to 8, and the machine-element components are machine-element components for the transmission.

In the transmission according to the embodiment, it is possible to lubricate the contact parts among the machine-element components for the transmission without feeding the lubricating liquid directly to the contact parts among the machine-element components for the transmission.

As aforementioned, the present disclosure can provide the lubrication structure and the transmission capable of lubricating the contact parts among the machine-element components without directly feeding the lubricating liquid to the contact parts among the machine-element components.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 10 is a line graph showing respective surface potentials of the test specimens B and C by streaming electrification.

DETAILED DESCRIPTION OF EMBODIMENTS

A vehicle transmission 10 using a lubrication structure 30 according to the first embodiment will be described with reference to FIG. 1 to FIG. 4.

Figure 1:
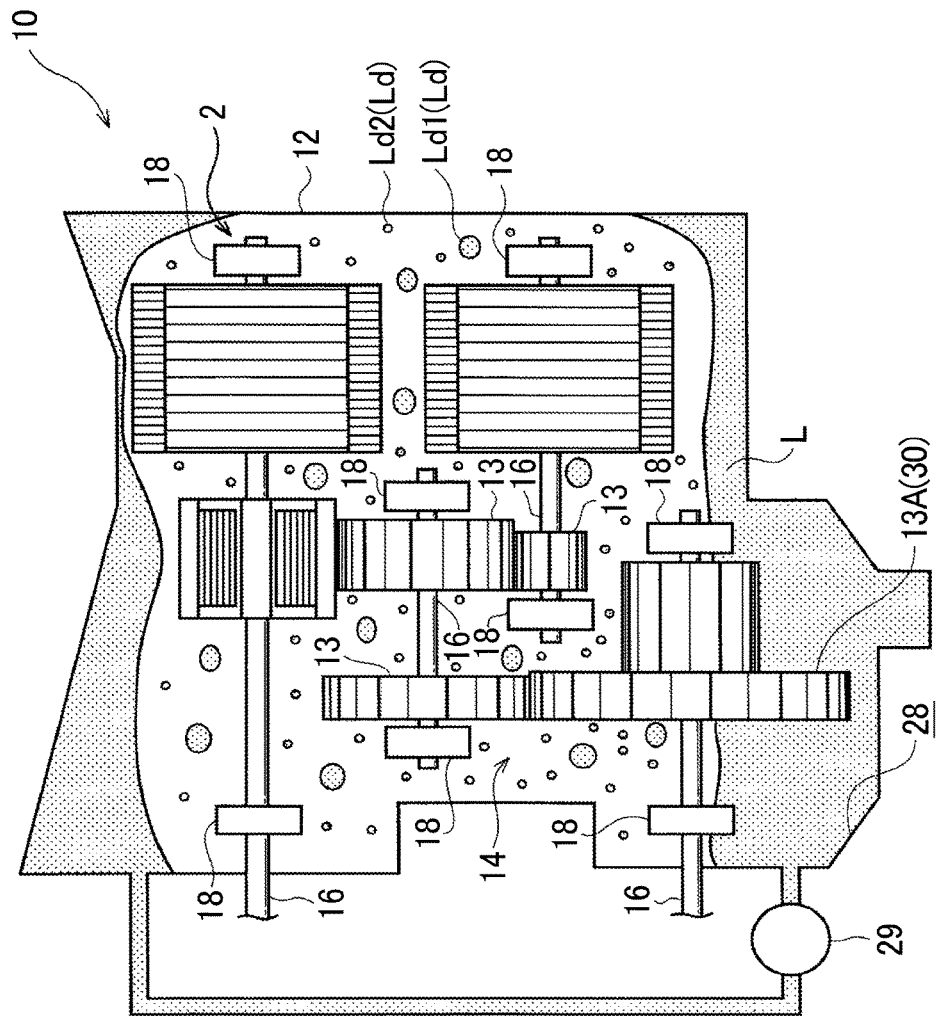
FIG. 1 is a sectional view schematically showing an overall configuration of a transmission using a lubrication structure according to a first embodiment.
Figure 2:
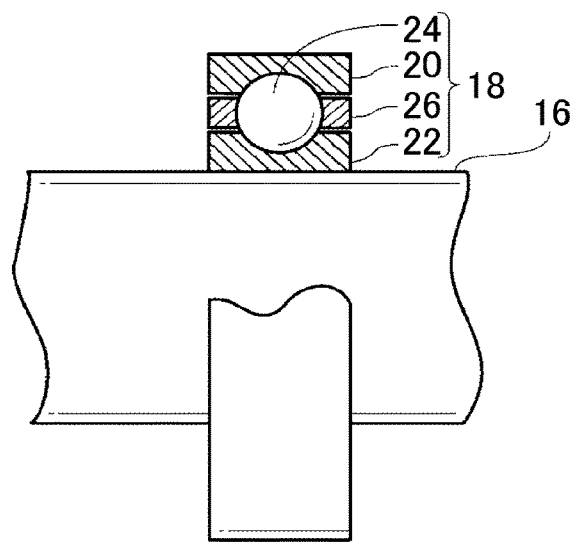
FIG. 2 is a partial sectional view of a machine-element component lubricated in the lubricating structure according to the first embodiment (partial sectional view indicated by an arrow 2 of FIG. 1)

As shown in FIG. 1, the transmission 10 includes a housing 12, gear trains 14 each including plural gears 13 housed in this housing 12, shafts 16 each supporting each corresponding gear train 14, and bearings 18 each rotatably supporting each corresponding shaft 16. The housing 12 of the present embodiment is an example of a case of the present disclosure. As shown in FIG. 2, an outer wheel 20, an inner wheel 22, each ball 24, and a retainer 26 are components included in each of the bearings 18 and each of the plural gears 13 configuring each gear train 14 of the present embodiment. The outer wheel 20, the inner wheel 22, each ball 24, and the retainer 26 are an example of machine-elements (machine-element components) of a transmission. A motor generator, a planetary gear mechanism, or the like is connected to each shaft 16 of the transmission 10 of the present embodiment.

An oil sump 28 where a lubricating oil L is reserved is disposed to a bottom portion of the housing 12. The oil sump 28 is an example of a liquid sump. This lubricating oil L is used for lubricating the machine-element components for the transmission, that is, the respective components included in each gear 13 and each bearing 18. The lubricating oil L of the present embodiment is an example of a lubricating liquid.

A gear 13A is soaked in the oil sump 28. The gear 13A is one of the plural gears 13 included in each gear train 14. At least a lower portion in the gravity direction of the gear 13A is soaked in the oil sump 28. Hence, if the gear 13A is rotated around an own axis thereof, the lubricating oil L is stirred and scooped up to be splashed in an oil drop state inside the housing 12.

As shown in FIG. 1, an oil pump 29 that pumps the lubricating oil L in the oil sump 28 is connected to the housing 12. The pumped lubricating oil L is fed to the respective components included in the gear trains 14 and the bearings 18 from above the gear trains 14 and the bearings 18. The fed lubricating oil L cools and lubricates the respective components included in the gear trains 14 and the bearings 18. The lubricating oil L is then returned to the oil sump 28 by gravity.

Figure 3:
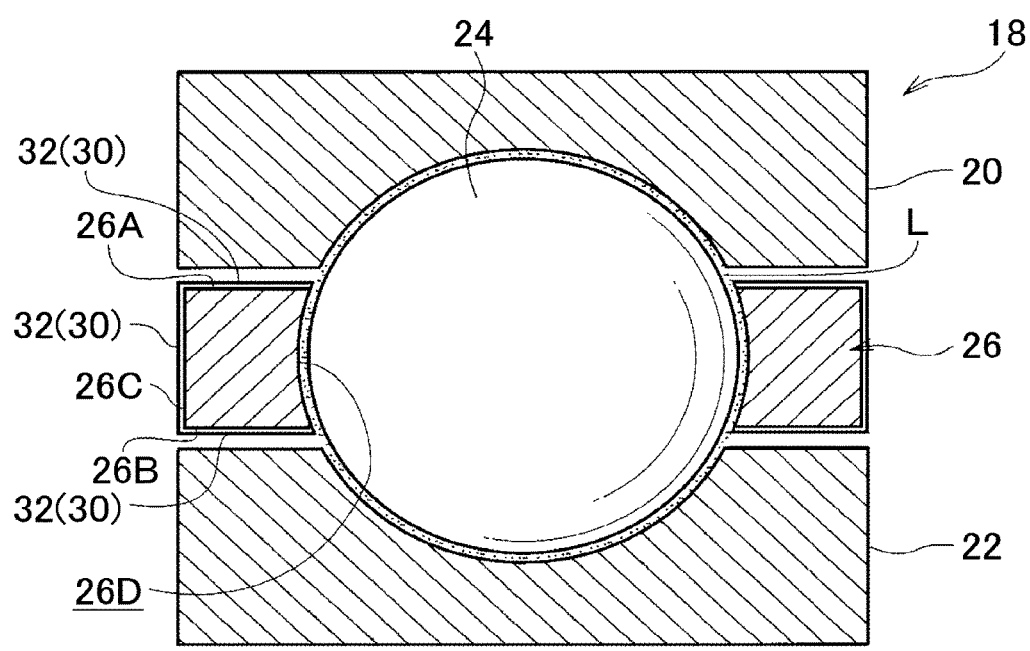
FIG. 3 is a partial enlarged view of the part as shown in the sectional view of FIG. 2.

As shown in FIG. 2 and FIG. 3, each bearing 18 of the present embodiment is a ball bearing classified into a rolling bearing. The bearing 18 includes the outer wheel 20, the inner wheel 22, each ball 24, and the retainer 26 as major components thereof. The outer wheel 20 is fixed to the housing 12. The shaft 16 is inserted through the inner wheel 22. Each ball 24 is disposed between the outer wheel 20 and the inner wheel 22. The retainer 26 has an annular shape. The retainer 26 retains each ball 24 between the outer wheel 20 and the inner wheel 22. In the present embodiment, an electret portion 32 described later is provided to each retainer 26. Contact parts among the components of each bearing 18 are lubricated by a lubrication effect described later. In the present embodiment, the contact parts among the components of each bearing 18 respectively denote contact parts between the outer wheel 20 and each ball 24, and between the inner wheel 22 and the each ball 24. These contact parts may also be referred to as sliding parts among the above components. Hence, these contact parts are appropriately referred to as the sliding parts among the components of each bearing 18 or the sliding parts of each bearing 18.

Figure 4:
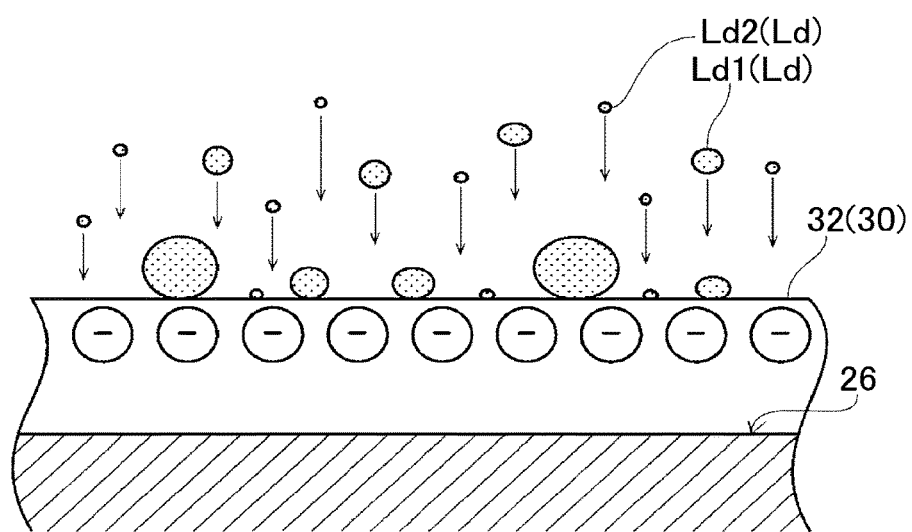
FIG. 4 is a sectional view of an electret portion, showing a state in which liquid drops of a lubricating liquid are attracted and adhere to the electret portion.

The major parts of the lubrication structure 30 of the present embodiment is the gear 13A and the electret portion 32. The gear 13A scoops up the lubricating oil L reserved in the oil sump 28. The gear 13A splashes the lubricating oil L in an oil drop state inside the housing 12 (see FIG. 1). The electret portion 32 is respectively disposed to the vicinities of the sliding parts (contact parts) among the components of each bearing 18. Each electret portion 32 is electretized. The gear 13A of the present embodiment is an example of a liquid drop splashing device or a rotary member. In FIG. 1 and FIG. 4, among liquid drops Ld, each oil or liquid drop having a greater liquid drop diameter is indicated as a splash oil drop by a reference numeral Ld1, and each oil or liquid drop having a smaller liquid drop diameter is indicated as a mist oil drop by a reference numeral Ld2.

As shown in FIG. 3, in the present embodiment, among the respective components included in each bearing 18, the retainer 26 in an annular shape is provided with the electret portion 32. This electret portion 32 is composed of an electretized film body. The electretized film body is postfixed to an outer surface 26A, an inner surface 26B, and a side surface 26C of the retainer 26. In the present embodiment, no electret portion 32 is provided onto a hole wall surface of a circular hole 26D that retains each ball 24 of the retainer 26. However, where to provide the electret portion 32 is not limited to this configuration. For example, the electret portion 32 may be provided onto the hole wall surface of each circular hole 26D. The electret portion 32 provided to the hole wall surface of each circular hole 26D becomes worn away due to contact with the ball 24.

"Electretization" referred to herein denotes electrifying the vicinity of a surface of an isolator. Specifically, "electretization" means that electric polarization is generated in an isolator having a strong dielectricity so as to bring the isolator into a state of semipermanently retaining an electric charge in the vicinity of the surface thereof. An example of a method to generate the electric polarization in an isolator may include a discharge treatment, a heat treatment, an X-ray treatment, an electron beam treatment, and an ultraviolet (UV) treatment, and any one of these methods may be used. "Semipermanently retaining an electric charge" means that a surface potential of an isolator is hard to be reduced, which is different from a general frictional electrification.

The electret portion 32 has liquid-repellency (oil-repellency) relative to the lubricating oil L. Specifically, the electret portion 32 has liquid-repellency of which wetting angle in a smooth surface is within a range of 50 to 90°. The wetting angle denotes a contact angle relative to the lubricating oil L. In the present embodiment, the film body configuring the electret portion 32 is an electretized fluoropolymer film. Hence, the film body has a high liquid-repellency relative to the lubricating oil L.

The electret portion 32 has a lower wettability (lipophilicity) relative to the lubricating oil L than that of each bearing 18 whose components are made of metal. In other words, each sliding part has a higher wettability relative to the lubricating oil L than that of the electret portion 32. The sliding parts denote sliding parts among the components included in each bearing 18. Accordingly, each sliding part is more likely to be wet, and is more easily lubricated with the lubricating oil L compared with the electret portion 32.

Operation of the present embodiment will be described hereinafter.

In the transmission 10 using the lubrication structure 30 of the present embodiment, the gear trains 14 and the bearings 18 are cooled and lubricated by the lubricating oil L pumped by the oil pump 29. The gear 13A is rotated along with rotation of the corresponding gear train 14. The lubricating oil L in the oil sump 28 is scooped up by the gear 13A so as to be splashed as the oil drops Ld inside the housing 12. As shown in FIG. 4, the splashed oil drops Ld are attracted and adhere to the electret portion 32 electretized in an electrified state.

As shown in FIG. 3, in the lubrication structure 30, the electret portion 32 is provided to the outer surface 26A of the retainer 26 located in the vicinity of the contact part (sliding part) between the outer wheel 20 and each ball 24. The oil drops Ld adhering to the electret portion 32 move toward the contact part (sliding part) between the outer wheel 20 and each ball 24 while combining into one with other adhering oil drops Ld. The oil drops Ld lubricate the contact part between the outer wheel 20 and each ball 24. On the other hand, the electret portion 32 is also provided to the inner surface 26B of the retainer 26 located in the vicinity of the contact part (sliding part) between the inner wheel 22 and each ball 24. The oil drops Ld adhering to the electret portion 32 move toward the contact part (sliding part) between the inner wheel 22 and each ball 24 while combining into one with other adhering oil drops Ld. The oil drops Ld lubricate the contact part (sliding part) between the inner wheel 22 and each ball 24. In this manner, in the transmission 10, through the lubrication structure 30, it is possible to lubricate the sliding parts among the components included in each bearing 18 by the oil drops Ld of the splashed lubricating oil L without directly feeding the lubricating oil L to the sliding parts. Hence, it is possible to lubricate even the sliding parts among the bearings 18 located at positions where the lubricating oil L pumped by the oil pump 29 is difficult to be directly fed. The "positions where the lubricating oil L is difficult to be directly fed" referred to herein denote an upper position in the housing 12, or positions far from a feeding port of the lubricating oil L, for example. The lubricating oil L pumped by the oil pump 29 is fed from the feeding port to the inside of the housing 12.

In the transmission 10, through the lubrication structure 30 of the present embodiment, it is possible to lubricate even the sliding parts among the bearings 18 located at positions where the lubricating oil L is difficult to be directly fed. For example, in a transmission that lubricates sliding parts among the bearings 18 by increasing the amount of the lubricating oil L inside the housing 12, increase in amount of the lubricating oil L causes increase in weight. To the contrary, in the transmission 10 of the present embodiment, the lubrication structure 30 enables even the sliding parts among the bearings 18 to be lubricated, thus suppressing increase in weight due to increase in amount of the lubricating oil L. Contrary to the transmission in which the sliding parts among the bearings 18 are lubricated by increasing the amount of the lubricating oil L, it is also possible to suppress increase in drag torque at the time of stirring the lubricating oil L in the oil sump 28 by the gear 13A. It is possible to reduce a workload of the oil pump of the transmission 10 to be smaller than a workload of the oil pump of the transmission to lubricate the sliding parts among the bearings 18 by increasing the amount of the lubricating oil L. In addition, in the transmission 10, since it is unnecessary to increase the amount of the lubricating oil L, it is possible to carry out warming-up of the lubricating oil L earlier.

In the lubrication structure 30, since each electret portion 32 has liquid-repellency (oil-repellency) relative to the lubricating oil L, the oil drops Ld adhering to the electret portion 32 are allowed to easily move to each sliding part among the bearings 18 along the surface of the electret portion 32. In addition, the wettability (lipophilicity) relative to the lubricating oil L of each sliding part among the bearings 18 is higher than the wettability of the electret portion 32. Hence, the oil drops Ld move to the sliding part along the surface of the electret portion 32. The above sliding part can be efficiently lubricated by the oil drops Ld moving from the surface of the electret portion 32.

In the lubrication structure 30, an electretized fluoropolymer film provided to the retainer 26 is used as the electret portion 32. Accordingly, the electret portion 32 can be post-fixed to each retainer 26 without requiring design changes of the components among the bearings 18.

The surface potential of each electret portion 32 is reduced over time. However, the surface potential can be restored by storing charges again through frictional electrification or streaming electrification, for example. The frictional electrification is carried out by sliding friction between the components included in each bearing 18, for example. The streaming electrification is carried out by friction between the electret portion 32 and the oil drops Ld moving along the surface of the electret portion 32, for example.

In the lubrication structure 30, it is possible to plash the oil drops Ld inside the housing 12 with a simple configuration using the gear 13A. The lubrication structure 30 of the present embodiment is configured to splash the oil drops Ld inside the housing 12 using the gear HA that is a machine-element component for the transmission. However, the lubrication structure 30 is not limited to this configuration. For example, the lubrication structure 30 may be configured to include a rotary member to scoop up the lubricating oil L in the oil sump 28, and splashes the oil drops Ld inside the housing 12.

As shown in FIG. 3, the lubrication structure 30 of the present embodiment is configured to respectively provide the electret portion 32 to the outer surface 26A, the inner surface 26B, and the side surface 26C of the retainer 26 of each bearing 18. However, the lubrication structure 30 is not limited to this configuration. It is possible to attain the lubrication effect by providing the electret portion 32 to at least one of the outer surface 26A and the inner surface 26B of the retainer 26 of each bearing 18.

Figure 5:
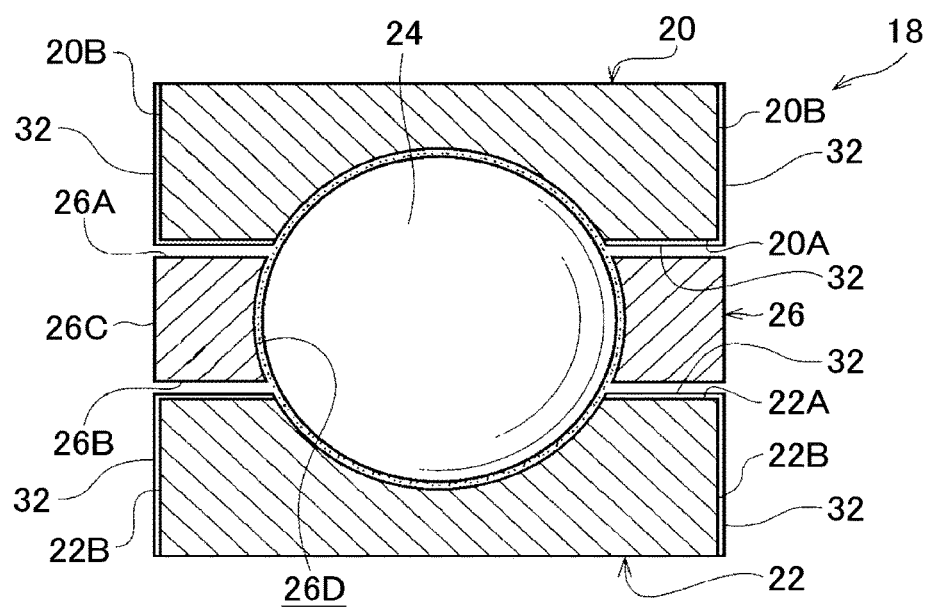
FIG. 5 is an enlarged sectional view of machine-element components lubricated in a variation of the lubrication structure according to the first embodiment (enlarged sectional view corresponding to FIG. 3)

In the lubrication structure 30 of the present embodiment, as shown in FIG. 3, the electret portion 32 is provided to the retainer 26. However, the lubrication structure 30 is not limited to this configuration. For example, as shown in a variation of FIG. 5, it may be configured that the electret portion 32 is provided to the outer wheel 20 and the inner wheel 22 instead of the retainer 26. Specifically, in the variation, the electret portion 32 is provided to an inner surface 20A and a side surface 20B of the outer wheel 20. The electret portion 32 is also provided to an outer surface 22A and a side surface 22B of the inner wheel 22. It should be noted that the inner surface 20A of the outer wheel 20 includes no contact part (sliding part) with each ball 24. The outer surface 22A of the inner wheel 22 includes no contact part (sliding part) with each ball 24. The electret portion 32 may be omitted at the side surface 20B of the outer wheel 20 and the side surface 22B of the inner wheel 22. The electret portion 32 may be respectively provided to the outer wheel 20, the inner wheel 22, and the retainer 26. In addition, in the case of using a spacer (so-called shim) for gap adjustment in each bearing 18, the electret portion 32 may also be provided to this spacer.

Furthermore, in the lubrication structure 30 of the present embodiment, the electret portion 32 is provided to the retainer 26 of each bearing 18 as a ball bearing that is classified into a rolling bearing. However, the lubrication structure 30 is not limited to this configuration. For example, each bearing 18 may be composed of a roller bearing classified into a rolling bearing. The electret portion may be provided to a retainer of this roller bearing. It may also be configured to provide the electret portion to a sliding part of each slide bearing.

Hereinafter, a vehicle transmission 40 using a lubrication structure 42 of the second embodiment will be described with reference to FIG. 6. The same reference numerals are used for configurations that are common to the first embodiment, and description thereof will be omitted.

Figure 6:
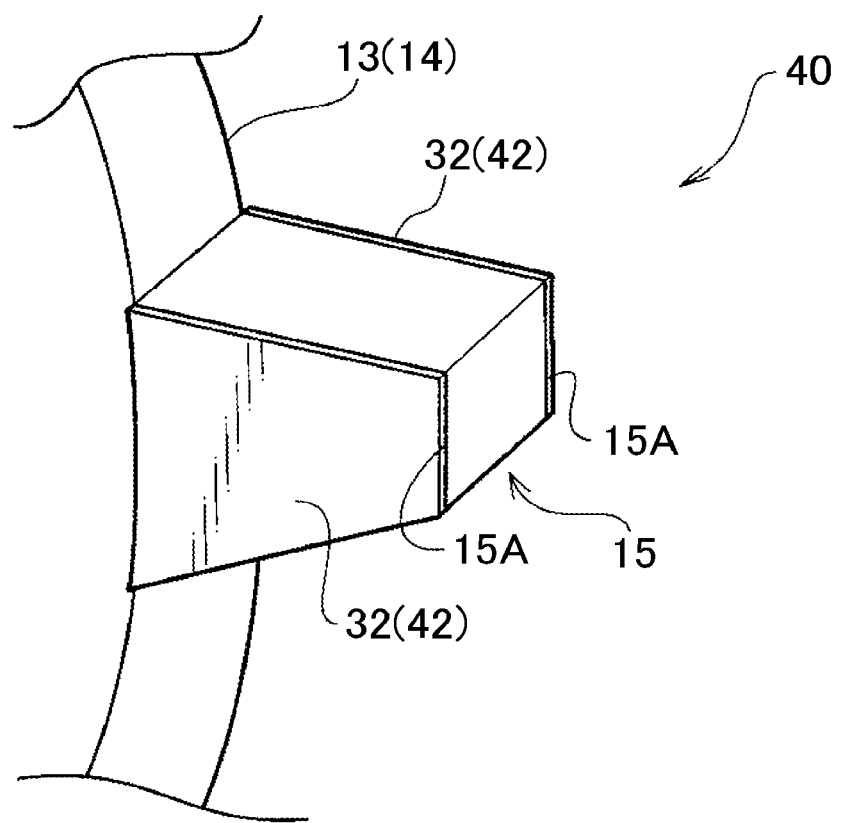
FIG. 6 is a perspective view showing a major part of a machine-element component lubricated by a lubrication structure according to a second embodiment.

As shown in FIG. 6, in the lubrication structure 42, in addition to the bearings 18, the electret portion 32 is also provided to the plural gears 13 included in each gear train 14. Specifically, in the axial direction of each gear 13, the electret portion 32 is respectively provided to both side surfaces of every cog 15. Because the gear 13A is partially soaked in the oil sump 28, no electret portion 32 may be provided thereto.

Operation of the lubrication structure 42 of the present embodiment will be described hereinafter. Description regarding operation attained by configurations that are common to the lubrication structure 30 of the first embodiment will be omitted.

In the lubrication structure 42, the electret portion 32 is provided to each side surface 15A of every cog 15 located in the vicinity of the contact part between the cogs 15 of corresponding adjacent gears 13. The oil drops Ld attracted and adhering to the respective electret portions 32 move to the contact part between the respective cogs 15 of the adjacent gears 13 of interest (hereinafter, referred to as "meshing parts among the gears 13"), thereby lubricating this meshing part. In this manner, in the transmission 40, the lubrication structure 42 of the present embodiment enables the meshing parts among the gears 13 located at positions where the lubricating oil L is difficult to be directly fed to be lubricated. Accordingly, in the transmission 40, it is possible to further suppress the following three points compared with the first embodiment: increase in weight due to increase in amount of the lubricating oil L; increase in drag torque at the time of stirring the lubricating oil L in the oil sump 28 by the gear 13A; and a workload of the oil pump 29 to pump the lubricating oil L.

In the lubrication structure 42 of the present embodiment, the electret portion 32 is respectively provided to the plural gears 13 and bearings 18. However, the lubrication structure 42 is not limited to this configuration. It may be configured to provide the electret portion 32 only to the plural gears 13. It is also possible to attain the lubrication effect at the meshing part between corresponding adjacent gears 13 by providing the electret portion 32 only to one gear of the adjacent gears 13. In addition, the electret portion 32 may be provided to the vicinities of machine-element components for another transmission housed in the housing 12. For example, the electret portion 32 may be provided to the vicinities of contact parts (sliding parts) among components included in a motor generator (machine-element components of a transmission) inside the housing 12. The electret portion 32 may also be provided to the vicinities of contact parts (meshing parts) among components included in a planetary gear mechanism (machine-element components for a transmission).

Hereinafter, a vehicle transmission 50 using a lubrication structure 52 of the third embodiment according to the present disclosure will be described with reference to FIG. 7. The same reference numerals are used for configurations that are common to the first embodiment, and description thereof will be omitted.

Figure 7:
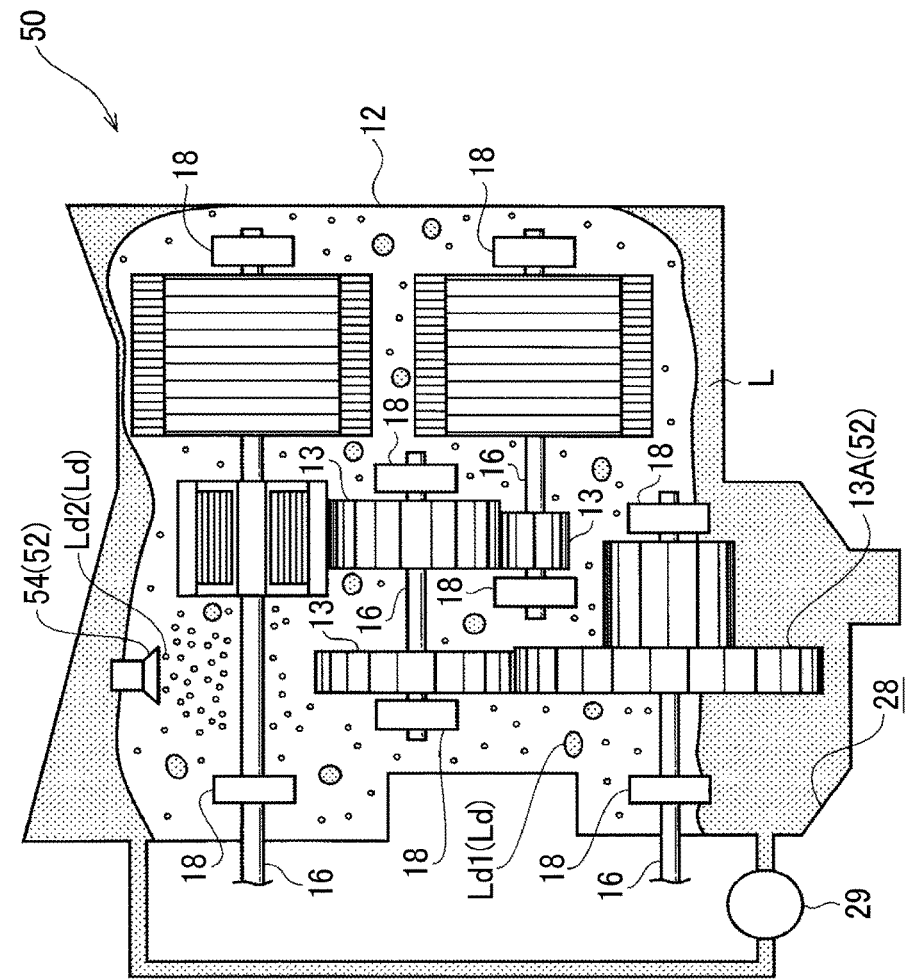
FIG. 7 is a sectional view schematically showing an overall configuration of a transmission using a lubrication structure according to a third embodiment.

As shown in FIG. 7, in addition to the gear 13A, the lubrication structure 52 includes a mist generator 54 that forms the lubricating oil L into oil drops Ld2 in a mist state, and splashes the oil drops Ld2 inside the housing 12. Specifically, the mist generator 54 is disposed inside the housing 12. The mist generator 54 is a device that forms part of the lubricating oil L pumped by the oil pump 29 into the oil drops Ld2 in a mist state, and sprays the oil drops Ld2 inside the housing 12. The mist generator 54 of the present embodiment is an example of a liquid drop splashing device (liquid drop generator) of the present disclosure.

Operation of the lubrication structure 52 of the present embodiment will be described hereinafter. Description regarding operation attained by configurations that are common to the lubrication structure 30 of the first embodiment will be omitted.

In the lubrication structure 42, the lubricating oil L is formed into the oil drops Ld2 in a mist state by the mist generator 54. The oil drops Ld2 in a mist state are sprayed inside the housing 12. Because the oil drops Ld2 in a mist state have a lighter weight, these oil drops are easily attracted to the electret portions 32. As a result, a large amount of the attracted oil drops Ld2 adhere to the surface of the electret portions 32. Increase in adhesive amount of the lubricating oil (oil drops) enables the sliding parts among the bearings 18 to be effectively lubricated. In the transmission 50, through the lubrication structure 52 of the present embodiment, it is possible to effectively lubricate even the sliding parts among the bearings 18 located at positions to which the lubricating oil L is difficult to be directly fed. Accordingly, in the transmission 50, it is possible to further suppress the following three points: increase in weight due to increase in amount of the lubricating oil L; increase in drag torque at the time of stirring the lubricating oil L in the oil sump 28 by the gear 13A; and a workload of the oil pump 29 to pump the lubricating oil L.

The configuration of disposing the mist generator 54 inside the housing 12 according to the present embodiment may be applied to the second embodiment.

In the lubrication structure 52 of the present embodiment, the gear 13A and the mist generator 54 are used in order to splash the oil drops Ld inside the housing 12. However, the lubrication structure 52 is not limited to this configuration. Only the mist generator 54 may be used in the lubrication structure 52.

In the lubrication structure 52 of the present embodiment, as an example of the liquid drop generator, the mist generator 54 that forms part of the lubricating oil L pumped by the oil pump 29 into the oil drops Ld2 in a mist state, and sprays the oil drops Ld2 inside the housing 12 is used. However, the lubrication structure 52 is not limited to this configuration. For example, as an example of the liquid drop generator, a mist generator that supplies compressed air into the oil sump 28 so as to spray the oil drops Ld2 in a mist state inside the housing 12 may be used. A mist generator that applies ultrasonic waves onto the oil sump 28 so as to generate the oil drops Ld2 may be used.

In the aforementioned embodiment, the electret portion 32 is provided to part of the surfaces of the components included in each bearing 18, and to part of the surfaces of the gears 13 included in each gear train 14. However, the transmission 50 is not limited to this configuration. In the transmission 50, the electret portion 32 may be provided to the entire surfaces of the components included in each bearing 18. The electret portion 32 may be provided to the entire surface of each gear 13. The electret portions 32 provided to the sliding parts among the components included in each bearing 18, and to the meshing parts among the gears 13 become easily worn out so that the metallic surfaces thereof are exposed. This is because the film body (fluoropolymer film) forming the electret portion 32 becomes easily worn out due to mechanical contact and others.

Each of the aforementioned lubrication structures 30, 42, 52 may be applicable to bearings, crankshafts, or valve trains of an internal combustion engine and an external combustion engine, or to gear boxes of common machines, and others, other than the vehicle transmissions 10, 40, 50.

The effect of the electretized electret portion to attract the oil drops of the present disclosure will be described with reference to test results hereinafter.

Test 1 was conducted so as to measure adhesive amount of oil. First, test specimens A, B, C were respectively placed in a hung state inside an airtight container. Oil mist (oil drops in a mist state) was then splashed inside the airtight container. Subsequently, adhesive amount of the oil adhering to each test specimen was measured. Measurement results are shown in a bar graph of FIG. 8.

Conditions of Test 1 are shown as follows:
a) type of oil: oil (lubricating oil); b) method of generating oil mist: compressed air was injected by an injector to an oil sump disposed to a lower portion of the airtight container so as to generate oil mist; c) air pressure: 0.4 MPa; d) measurement time: 60 minute; e) ambient temperature: 27.4±1° C.; and f) test specimens: the following three types were used, i) test specimen A: silicon wafer, ii) test specimen B: silicon wafer of which surface was provided with a fluoropolymer film having a film thickness of 1 to 20 µm (Cytop (registered trademark) manufactured by Asahi Glass Co., Ltd.), and iii) test specimen C: silicon wafer of which surface is provided with an electretized fluoropolymer film having a film thickness of 1 to 20 µm (Cytop (registered trademark) manufactured by Asahi Glass Co., Ltd.).

Figure 8:
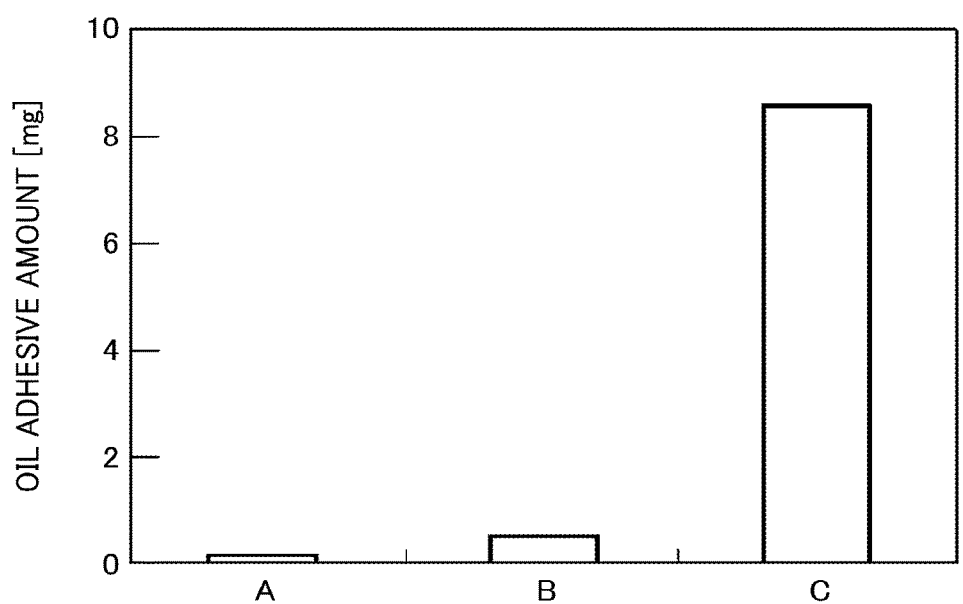
FIG. 8 is a bar graph showing respective adhesive amount of lubricating oil adhering to test specimens A to C.
Figure 9:
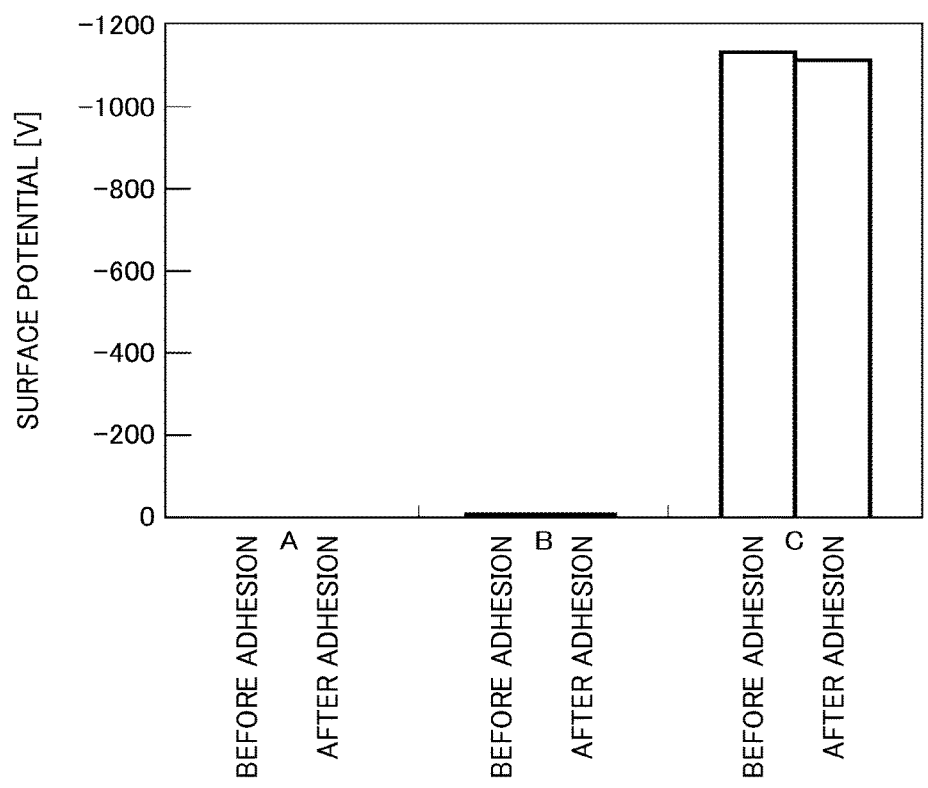
FIG. 9 is a bar graph showing respective surface potentials of the test specimens A to C before adhesion of the lubricating oil and after adhesion of the lubricating oil.

As shown in FIG. 8, almost no oil mist adhered to the test specimens A and B. The oil mist adhered only to the test specimen C. From this result, it is found that the oil mist having a lighter weight was attracted and adhered to the electretized fluoropolymer film of the test specimen C. At that time, as shown in a bar graph of FIG. 9, a surface potential of the electretized fluoropolymer film of the test specimen C was hardly reduced. It is found that an electrified state is maintained in the electretized fluoropolymer film.

Next, Test 2 was conducted so as to measure surface potentials of the test specimens B and C. First, each of the test specimens B and C was bonded to an outer circumference of a rotor in a disk shape, and was putted into the oil sump. In this state, the rotor was rotated so as to generate streaming electrification by shear friction between each test specimen and the oil. The respective surface potentials of the test specimens B and C were measured. Measurement results are shown in a line graph of FIG. 10.

Conditions of Test 2 are shown as follows:

g) type of oil: oil (lubricating oil); h) shear condition: movement in the oil sump; i) shear rate: 8.8 mm/s (1400 rpm); j) ambient temperature: 24.1 to 24.3° C.; and k) test specimen: test specimens B and C used in Test 1, but the surface potential of the test specimen C was intentionally reduced.

As shown in the line graph of FIG. 10, it is found that in the test specimen C, even if the surface potential of the electretized fluoropolymer film became reduced, this fluoropolymer film can store an electric charge again through streaming electrification by shear friction with the oil, thereby restoring the surface potential thereof. In the test specimen B, the fluoropolymer film was not electretized, and thus the surface potential thereof stayed at zero almost all the time.

What is claimed is:

1. A lubrication structure comprising:
   a liquid drop splashing device configured to form a lubricating liquid used for lubricating machine-element components into liquid drops,
   the liquid drop splashing device being configured to splash the lubricating liquid formed into the liquid drops, the machine-element components configuring contact parts, each contact part being a part where corresponding adjacent machine-element components come into contact with each other; and
   an electret portion provided to a vicinity of each contact part, the electret portion composed of an electret.

2. The lubrication structure according to claim 1, wherein the electret portion has liquid-repellency relative to the lubricating liquid.

3. The lubrication structure according to claim 1, wherein wettability between the electret portion and the lubricating liquid is smaller than wettability between each contact part and the lubricating liquid.

4. The lubrication structure according to claim 1, wherein the electret portion is an electretized fluoropolymer film provided to a surface of each machine-element component.

5. The lubrication structure according to claim 1, further comprising:
   a case; and
   a liquid sump,
   wherein
   the case houses the machine-element components,
   the liquid sump is disposed to a bottom portion of the case,
   the liquid sump is configured to reserve the lubricating liquid in the liquid sump,
   the liquid drop splashing device is soaked in the lubricating liquid reserved in the liquid sump while the liquid drop splashing device is rotatably supported,
   the liquid drop splashing device includes a rotary member, the rotary member is configured to scoop up the lubricating liquid in the liquid sump by rotation, and the rotary member is configured to splash the liquid drops inside the case.

6. The lubrication structure according to claim 1, wherein the liquid drop splashing device includes a liquid drop generator, and
   the liquid drop generator is configured to splash the lubricating liquid in a mist state.

7. The lubrication structure according to claim 1, wherein the machine-element components are components included in a bearing,
   the components include sliding parts at each of which corresponding adjacent components slide against each other, and
   the electret portion is provided to a vicinity of each sliding part.

8. The lubrication structure according to claim 1, wherein the machine-element components are gears, and
   the electret portion is provided to a vicinity of a meshing part between corresponding adjacent gears.

9. A transmission comprising:
   a lubrication structure including a liquid drop splashing device and an electret portion,
   the liquid drop splashing device being configured to turn a lubricating liquid for lubricating machine-element components into liquid drops,
   the liquid drop splashing device being configured to splash the lubricating liquid turned into the liquid drops, the machine-element components configuring contact parts, each contact part being a part where corresponding adjacent machine-element components come into contact with each other, and
   the electret portion being provided to a vicinity of each contact part, the electret portion composed of an electret.

* * * * *